(12) United States Patent
Hebblethwaite

(10) Patent No.: US 8,226,753 B2
(45) Date of Patent: Jul. 24, 2012

(54) TANK WITH CONTAINMENT CHAMBER AND SEPARATOR

(75) Inventor: Russ Hebblethwaite, Union Bay (CA)

(73) Assignee: Enviro Vault Inc., Union Bay, British Columbia (CA)

( * ) Notice: Subject to any disclaimer, the term of this patent is extended or adjusted under 35 U.S.C. 154(b) by 166 days.

(21) Appl. No.: 12/855,959

(22) Filed: Aug. 13, 2010

(65) Prior Publication Data

US 2011/0036241 A1 Feb. 17, 2011

(30) Foreign Application Priority Data

Aug. 13, 2009 (CA) ..................................... 2675482

(51) Int. Cl.
*B01D 19/00* (2006.01)
(52) U.S. Cl. ...................................... 96/155; 220/567.2
(58) Field of Classification Search .................... 96/155; 220/567.2
See application file for complete search history.

(56) References Cited

U.S. PATENT DOCUMENTS

| 4,131,785 | A | 12/1978 | Shutt |
| 4,803,343 | A | 2/1989 | Sotani et al. |
| 5,139,390 | A | 8/1992 | Rajewski |
| 5,197,627 | A | 3/1993 | Disabato et al. |
| 5,259,895 | A | 11/1993 | Sharp |
| 5,960,826 | A * | 10/1999 | Hebblethwaite et al. ..... 137/551 |
| 5,971,009 | A * | 10/1999 | Schuetz et al. ................ 137/312 |
| 6,318,581 | B1 | 11/2001 | Garton |
| 6,516,754 | B2 | 2/2003 | Chadwick |
| 7,165,572 | B2 * | 1/2007 | Hebblethwaite .............. 137/312 |
| 7,314,058 | B2 | 1/2008 | Saito |

FOREIGN PATENT DOCUMENTS

| CA | 2169126 | 8/1997 |
| CA | 2196842 | 12/2000 |
| CA | 2609642 | 5/2009 |
| CA | 2675482 | 2/2011 |
| WO | 2011/035429 | 3/2011 |
| WO | 2011/069260 | 6/2011 |

* cited by examiner

*Primary Examiner* — Duane Smith
*Assistant Examiner* — Douglas Theisen
(74) *Attorney, Agent, or Firm* — Bennett Jones LLP

(57) ABSTRACT

A fluid storage tank has an internal spill containment chamber and a separator having a fluid inlet, a gas outlet and a liquid outlet passing into the storage tank.

7 Claims, 2 Drawing Sheets

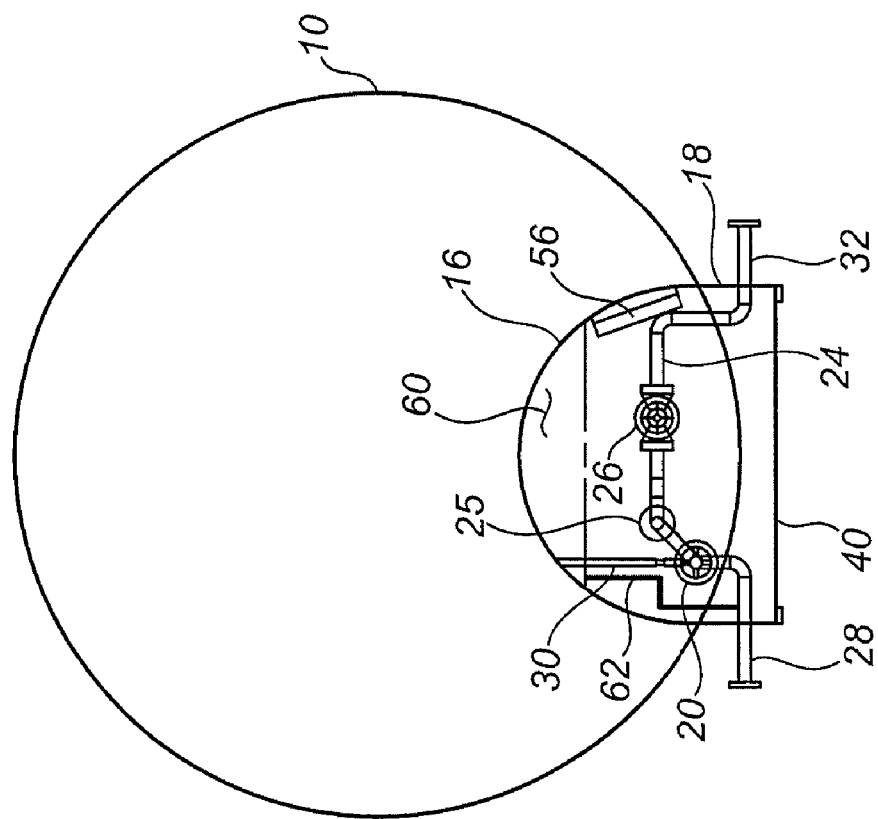
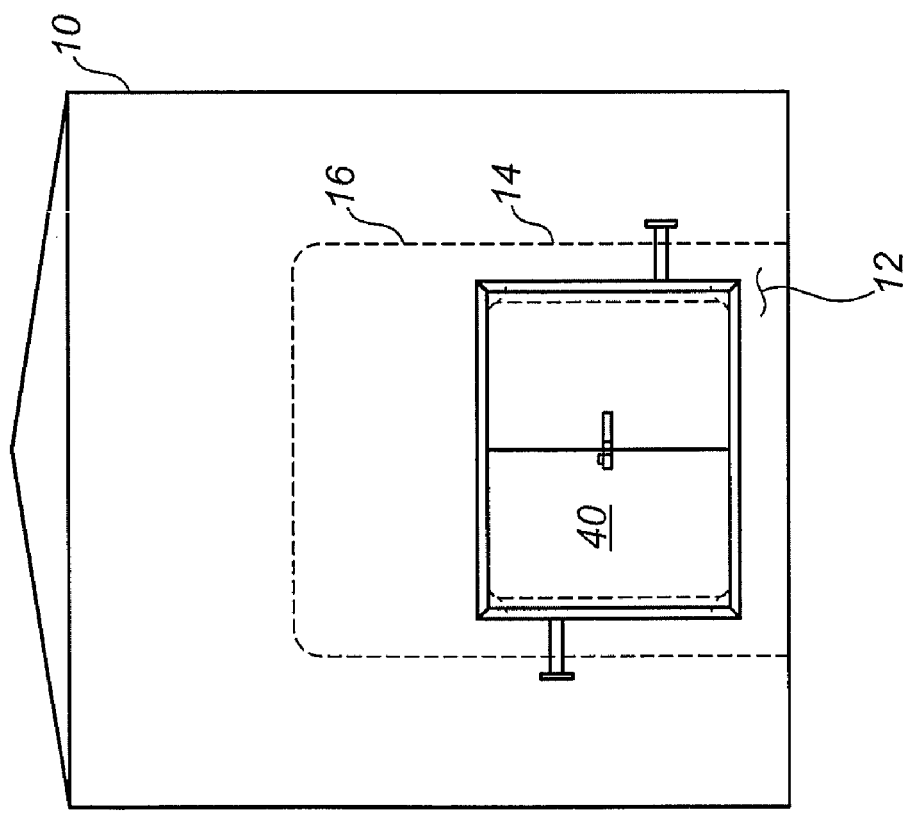

TANK WITH CONTAINMENT CHAMBER AND SEPARATOR

FIELD OF THE INVENTION

The invention relates to an above-ground fluid storage tank with a valve and spill containment system and a phase separator.

When oil or natural gas are extracted from the ground, it is often extracted along with volumes of water mixed with particulate solids such as sand and carbon. The gas is separated from the mixture and the fluids (oil or water) mixed with solids is diverted to a storage tank for temporary storage in the field. Although these fluid storage tanks may vary in size from 25 barrel capacity to over 100,000 barrel capacity, a common size tank is in the 750 to 1000 barrel range. Such tanks are normally cylindrical, have a radius of between about 4 feet and 10 feet.

Above-ground fluid storage tanks may create risks of environmental damage. There is nearly always spillage from outlet valves or the loading spout whenever a hose is connected or disconnected. Also, these tanks are known to overflow if they are not emptied on a regular basis. The overflow occurs through vents and thief hatches normally provided at the top of the tank and the fluid runs down the exterior of the tank onto the ground.

One cumbersome prior art solution to the freeze-up problem is to wrap the outlet valves in insulation, to prevent freezing. However, this insulation may come loose and further, deteriorates quickly as it becomes saturated with oil and salt water. The salt water can cause corrosion problems with the valve and the tank. Also, insulating the valve does not always ensure the valve does not freeze in very cold weather.

Another prior art solution is to build a cabinet around the valve on the exterior of the tank. This cabinet often does not have a floor; it is open to the ground. However, this solution also does not prevent freezing of the valve in very cold weather and provides only limited containment of spills and leakage.

Where produced fluids include an economic amount of natural gas, it is necessary to meter the gas to determine its pressure and volume. Such measurement may be accurately done only if entrained liquids are removed from the gas first. The use of in-line separators has become common to separate the liquid and gas phases from the produced fluid. Water is removed from the produced gas as it comes from the wellhead via flow-line. The separation takes place within high pressure piping and a separator vessel. These separators can suffer from the freezing and spillage problems described above.

SUMMARY OF INVENTION

The present invention relates to a fluid storage tank having an interior volume and a floor and having an internal spill containment chamber comprising a separator. In one embodiment, the chamber is defined by a containment wall having an internal portion which completely separates the chamber from the tank interior volume. In another embodiment, the containment wall comprises an exterior portion which extends beyond the tank wall. The separator is disposed within the chamber and comprises a fluid inlet, a gas outlet and metering system, a liquid outlet which passes through the containment wall and empties into the tank interior volume, and a flow valve.

BRIEF DESCRIPTION OF DRAWINGS

The invention will now be described by way of an exemplary embodiment with reference to the accompanying simplified, diagrammatic, not-to-scale drawings. In the drawings:

FIG. 1 is a pictorial view of the exterior of an oil storage tank with a spill containment chamber and enclosed separator;

FIG. 2 is a top plan view of one embodiment of the chamber;

DETAILED DESCRIPTION

Figure 4:
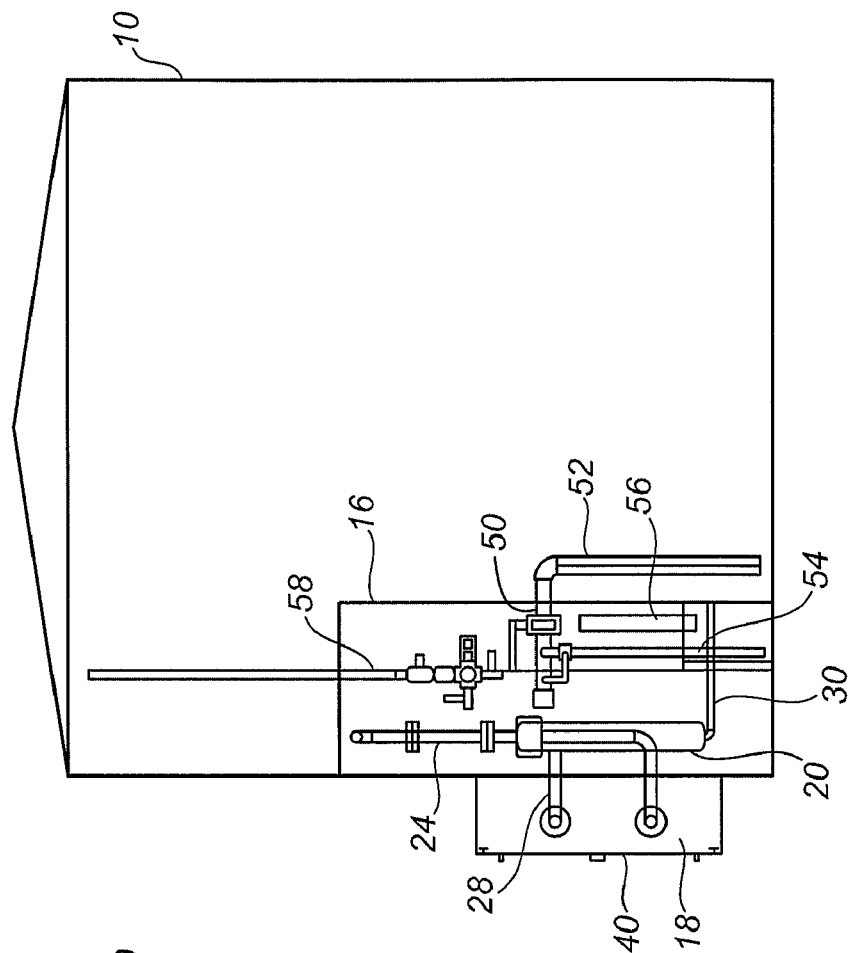
FIG. 4 is a vertical cross-sectional view of the chamber.
Figure 3:
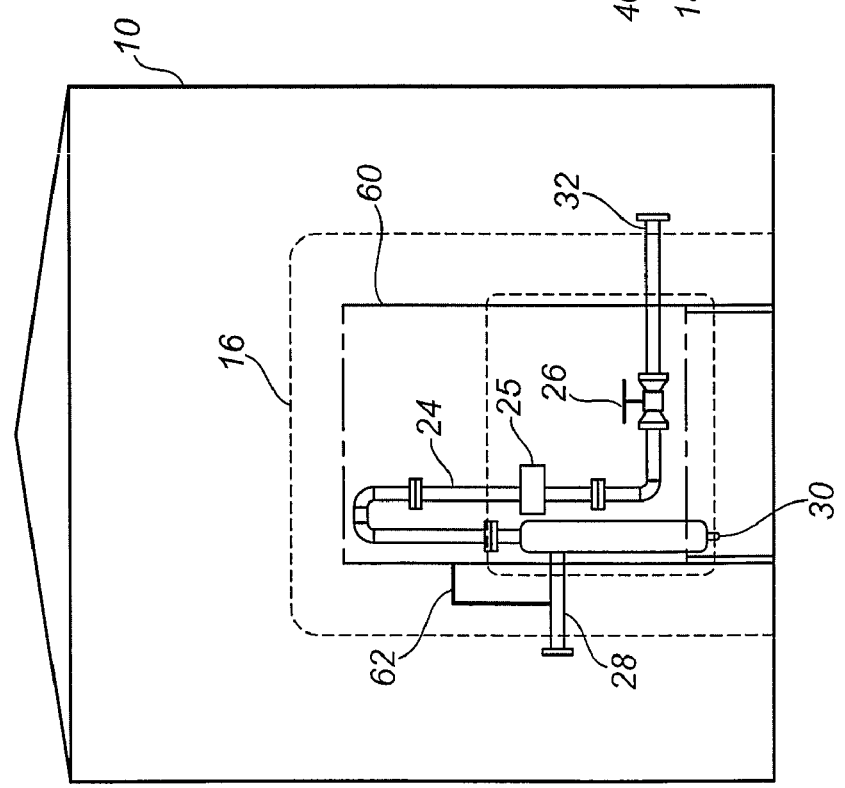
FIG. 3 is front view of the embodiment of FIG. 2.

The present invention provides for fluid storage tank having an internal spill containment chamber and an integrated separator. In particular, the present invention is directed at above-ground fluid storage tanks that can be used for temporary storage of fluids produced during oil and gas production. When describing the present invention, all terms not defined herein have their common art-recognized meanings.

Standard above-ground fluid storage tanks with spill containment chambers are known. The Figures depict a fluid storage tank (10) having a spill containment chamber (12), which is defined by containment wall (14) having an interior portion (16) which completely separates the chamber from the interior volume of the tank. In one embodiment, an exterior portion (18) of the containment wall (14) extends outward from the tank periphery. The exterior portion (18) may be a continuation of the interior portion (16), or may be attached to the interior portion or to the tank wall to create an extension of the spill containment chamber.

The chamber (12) encloses an in-line gas/liquid separator (20), which are well-known in the art. The separator (20) comprises an inlet (28) which receives fluids from the wellhead. Liquids separated from the gas drops from the bottom of the separator (20) and is sent into the tank liquid outlet (30) and through into the fluid storage tank (10). The gas phase of the wellhead production fluids exits the top of the separator (20) via piping (24) and a primary valve (26) controlling gas flow exiting the separator through pipe (32). The valve (26) is contained within the containment chamber, and may be a ball valve or other commonly used valve in the industry. The fluid inlet (28) or the gas outlet pipe (32), or both the fluid inlet (28) and the gas outlet (32) may pass through the exterior portion (18) of the containment wall.

The gas outlet (24) may include a meter run (25) where gas pressure and volume is calculated. The metering system (25) may include a data storage mechanism or a data transmission system for storing or transmitting the gas data, utilizing various well-known microprocessor based systems.

Access to the chamber and the separator may be provided by a door (40) or panel fitted the exterior portion of the containment wall. The exterior portion of the containment wall and the door (40) may be insulated to improve heat retention in the chamber.

The types and sizes of valves and fittings to connect the separator are conventional and suitable components may be chosen by those skilled in the art.

The containment chamber (12) may also include valves and outlets configured in a like manner to that described in Applicant's commonly-owned U.S. Pat. Nos. 5,960,826 or 7,165,572,the contents of both which are incorporated herein by reference, where permitted. In particular, a tank suckout (50) may be provided to allow removal of the tank contents from a specified level. As shown in FIG. 4, in one embodiment, a tank suckout (50) is connected to a pipe (52) near the bottom of the tank. A chamber suckout pipe (54) may be attached to permit removal of any fluid contained in the chamber itself.

The chamber suckout pipe has a first end and a second end where the recovery pipe is attached to the tank suckout and the recovery pipe extends into the chamber. When suction is applied to the end of the fluid outlet and the tank suckout valve is closed and the chamber suckout valve is open, fluid in the chamber may be recovered.

Other optional elements which may be included in the containment chamber may be chosen, such as, without limitation, heating elements such as a catalytic heater (56), or a high level shutdown switch (58).

In one embodiment, a methanol tank (60) may be provided in the containment chamber. In one embodiment, the containment wall may form part of the methanol tank wall, or the methanol tank (60) may be a discrete vessel within the chamber. The methanol may be pumped into the system near the inlet (28), or another suitable point, via methanol line (62). As is well known in the art, the methanol may act to control hydrates and may act as an antifreeze within the separator.

As will be apparent to those skilled in the art, various modifications, adaptations and variations of the foregoing specific disclosure can be made without departing from the scope of the invention claimed herein. The various features and elements of the described invention may be combined in a manner different from the combinations described or claimed herein, without departing from the scope of the invention.

What is claimed is:

1. A fluid storage tank having a tank wall defining an interior volume, the tank comprising:
    (a) an internal spill containment chamber defined by a containment wall having an internal portion which completely separates the chamber from the tank interior volume;
    (b) a separator disposed within the chamber and comprising a fluid inlet, a gas outlet and a metering system, a liquid outlet passing through the containment wall and in fluid communication with the interior volume, and a flow valve.

2. The tank of claim 1 wherein the containment wall comprises an exterior portion extending beyond the tank wall.

3. The tank of claim 2 wherein the fluid inlet or the gas outlet, or both the fluid inlet and gas outlet pass through the exterior portion of the containment wall.

4. The tank of claim 1 further comprising a catalytic heater disposed within the containment chamber.

5. The tank of claim 1 further comprising a tank suckout valve and pipe, for applying a vacuum to the tank contents.

6. The tank of claim 5 further comprising a containment chamber suckout valve and pipe.

7. The tank of claim 1 further comprising a methanol tank disposed within the containment chamber and a methanol injection pipe connected to the separator.

\* \* \* \* \*